Aug. 20, 1957 L. E. ELFES 2,803,358
HITCH FOR CONNECTING TRAILED DEVICES TO TRACTIVE VEHICLES
IN COMBINATION WITH A LOAD HANDLING DEVICE
Filed Feb. 25, 1954 5 Sheets-Sheet 1

Fig.1

INVENTOR.
LEE E. ELFES
BY
Carlson, Pitzner, Hubbard & Wolfe
ATTORNEYS.

INVENTOR.
LEE E. ELFES
BY
Carlson, Pitzner, Hubbard & Wolfe
ATTORNEYS.

Aug. 20, 1957  L. E. ELFES  2,803,358
HITCH FOR CONNECTING TRAILED DEVICES TO TRACTIVE VEHICLES
IN COMBINATION WITH A LOAD HANDLING DEVICE
Filed Feb. 25, 1954   5 Sheets-Sheet 5

INVENTOR.
LEE E. ELFES
BY
Carlson, Pitzner, Hubbard & Wolfe
ATTORNEYS.

United States Patent Office 2,803,358
Patented Aug. 20, 1957

2,803,358

HITCH FOR CONNECTING TRAILED DEVICES TO TRACTIVE VEHICLES IN COMBINATION WITH A LOAD HANDLING DEVICE

Lee E. Elfes, Birmingham, Mich., assignor, by mesne assignments, to Massey-Harris-Ferguson Inc., Racine, Wis., a corporation of Maryland Application February 25, 1954, Serial No. 412,446

6 Claims. (Cl. 214—140)

This invention relates to a new and improved hitch for connecting trailed devices to tractors and other tractive vehicles. The term "trailed devices" is intended to embrace trailers and trailed implements such as forage harvester, combines, and corn pickers, to name only a few. In another aspect, the invention relates to a new and improved combination of a trailer hitch with a load lifting implement, such as a front end loader. In some respects, the present invention may be regarded as an improvement upon the invention disclosed and claimed in the copending application of Theo Sherwen, Serial No. 63,404, filed December 3, 1948.

An object of the invention is to provide a new and improved trailer hitch of the type utilizing a power lift device on a tractor for moving a coupling device between a lowered hitching position and a raised towing position.

Another object is to provide a hitch of the foregoing character having new and improved means for latching the coupling device in its raised, towing position so as to relieve the power lift device of the weight imposed upon the coupling device by the trailed device. A further object in this connection is to provide a new and improved latching device of the foregoing character which is arranged so that the latching device cannot be released when under load. In this way, the trailed device will not be dropped abruptly, and damage to the hitch will thereby be avoided.

Another object is to provide a latching device of the foregoing character which may readily be disabled at the will of the operator, so that an auxiliary implement such as a front end loader may be employed on the tractor and operated in the normal manner by the power lift device, without interference from the latching device.

It is another object of the invention to provide a new and improved combination of a trailer hitch and a front end loader, arranged so that both the loader and the hitch may be operated by the power lift device on the tractor without any interference. A further object is to provide a combination hitch and loader of the foregoing character which is provided with new and improved means whereby the hitch, once lifted by the power lift device on the tractor, may be latched mechanically in raised position, together with means for disabling the latching means so that the loader may be operated by the power lift device without interference.

Another object is to provide a new and improved hitch adapted to be attached to a tractor provided with a trailingly pivoted draft link operable by a power lift device provided with disabling means whereby the power life device will be disabled when the draft link has been raised to its normal uppermost position. A further object in this connection is to provide a hitch of the foregoing character having new and improved means for terminating upward movement of the draft link short of its normal uppermost position to prevent disabling of the hydraulic lift device so that fluid from the latter may be employed to operate auxiliary devices. A still further object is to provide a hitch of the foregoing character in which the upward movement of the draft link will be terminated short of the normal uppermost position when a trailed device is connected to the hitch, but will not be so terminated when the trailed device is disconnected. In this way, the hydraulic lift device may be employed to operate an implement such as a front end loader in the normal manner when the trailed device is disconnected.

Still another object is to provide a combination of a hitch with a front end loader whereby the loader may be operated in the normal manner by a hydraulic power lift device on the tractor when no trailed device is connected to the tractor, and whereby the hydraulic lift device may be employed to operate auxiliary devices when a trailed device is hitched to the tractor.

Further objects and advantages of the invention will appear during the course of the following description, taken with the accompanying drawings, in which.

Referring more particularly to the drawings, the invention has been exemplified as embodied in a mechanism especially designed for attachment to the present commercial form of the "Ferguson" tractor. Such mechanism has, accordingly, been illustrated in the drawings as installed on such a tractor indicated in this instance at 10 in Fig. 1. It will be appreciated by those skilled in the art, however, that various substitutions or changes in parts, or alternative or modified arrangements may be used, particularly in accommodating the mechanism to other specific forms of tractors. There is, therefore, no intention to limit the invention to the precise mechanism illustrated. On the other hand, the intention is to cover all alternative or equivalent constructions falling within the spirit and scope of the invention as expressed in the specification and the appended claims.

The general construction and operation of the illustrated tractor, including its power operative hitch, will be familiar to those skilled in the art. Moreover, the details of the tractor and the hitch may be learned by reference to the Ferguson Patent No. 2,118,180. For the present, it will suffice simply to identify those tractor parts with which the mechanism of the present invention is directly associated.

Trailing from the rear end of the tractor 10 (Figs. 1, 2 and 4) is a pair of hitch links 21 disposed in forwardly converging, side by side relation and pivoted at 22 on the tractor's center housing 22a to swing vertically in unison as well as to sway laterally. The pivots 22 are located below and slightly forward of the center of the tractor's rear axle 23. Drop links 24 suspend the hitch links 21 from crank arms 25 rigidly fixed to opposite ends of a transverse rock shaft 26 (Fig. 4) journaled in the upper portion of the center housing 22a. A depending arm 27, also rigid with the shaft 26, is socketed to receive the rear end of the connecting rod 28, which connects this arm to a ram piston 29 slidable in a hydraulic cylinder 30. Admission of pressure fluid to the cylinder 30 thrusts the piston 29 to the rear, raising the hitch links 21, while exhausting fluid from the cylinder permits the hitch links to descend under the force of gravity.

Manual control of the hydraulic power mechanism for the hitch links is accomplished by a quadrant lever 31 located within convenient reach of the driver. Fixed to this lever is a cam projection 32 eccentric to the lever's pivot 33 and arranged to bear against a follower pad 34 on the upper end of a floating lever 35. A contractile spring 33a urges the lever 35 to swing clockwise about its pivot 36 on a sliding member 37 and thus retain the pad 34 in contact with the eccentric pin 32.

The lower end of the lever 35 is pivotally connected to a stem 39 (Fig. 4a) having an enlarged head 40 received within a generally cylindrical valve plunger 42 having tapered end portions. The head 40 is held against an internal shoulder 42a in the plunger by a compression spring 41. The valve plunger 42 is slidable in a sleeve 43 having axially spaced sets of intake and exhaust ports 44 and 49, respectively. With the valve plunger in its mid or neutral position, both sets of ports are blocked. Sliding of the plunger in either direction from its neutral position opens a corresponding set of the ports (the so-called "proportioning effect" resulting from the progressive opening of the ports which ensues upon sliding of the plunger is augmented by the tapered shape of the plunger) but retains the other set blocked.

Figure 1:
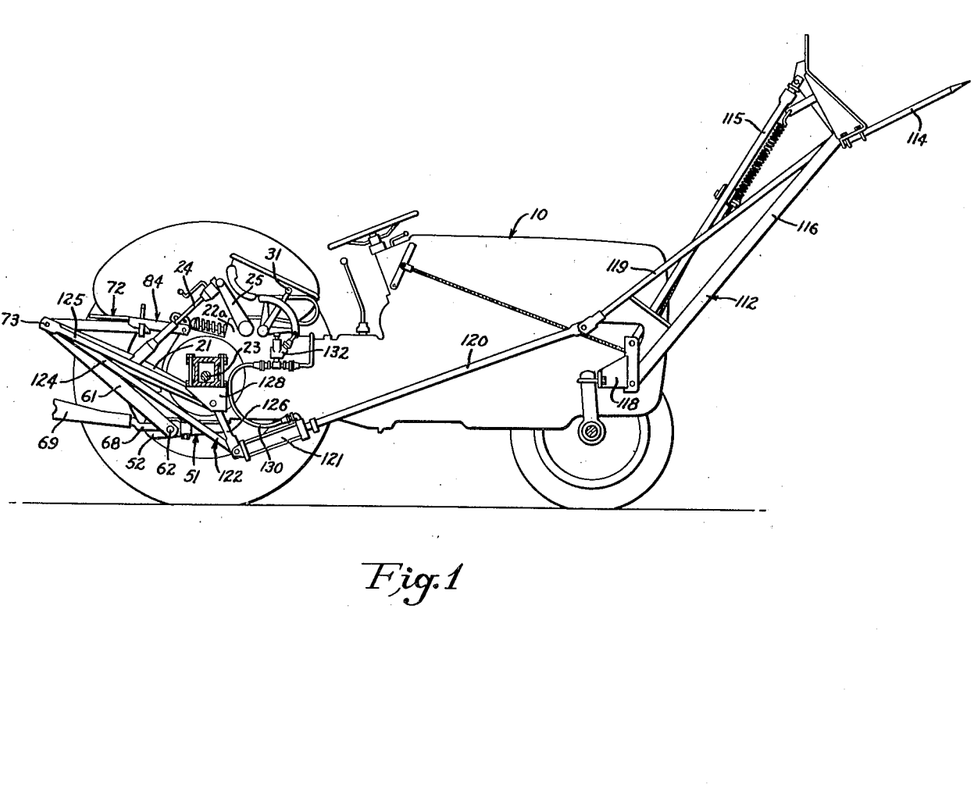
Figure 1 is a general side elevational view of an illustrative trailer hitch embodying the present invention, the hitch being shown in combination with a front end loader and attached to a well-known four-wheeled tractor. Also shown is the tongue of a trailed device such as a trailer. In this view the hitch is shown in its raised, towing position, the front end loader also being in its raised position.
Figure 2:
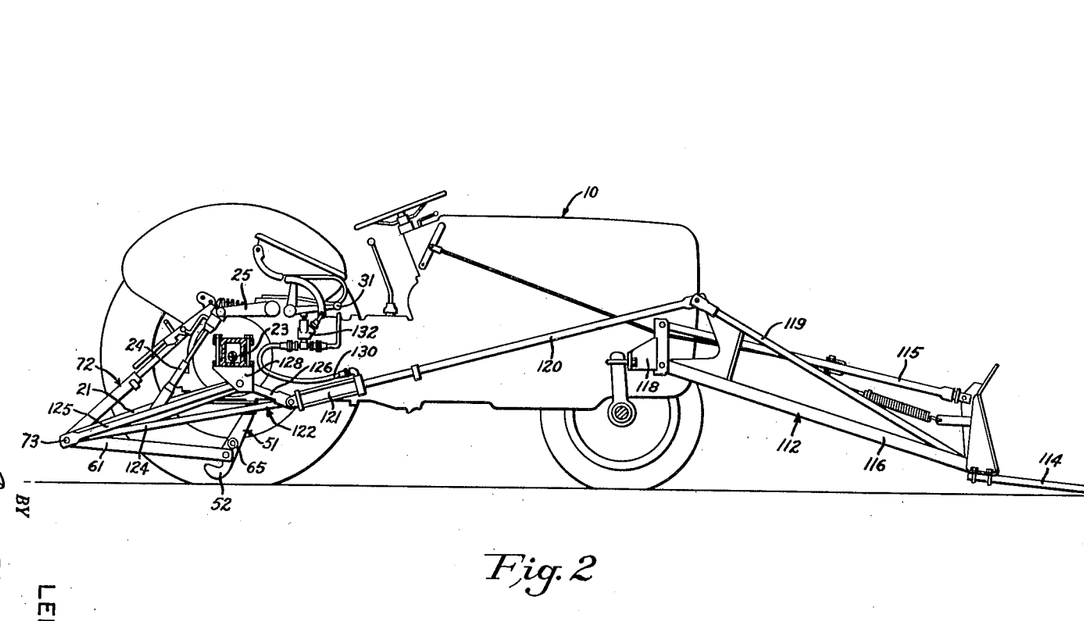
Fig. 2 is a view similar to Fig. 1 but showing the hitch in its lowered, hitching position, the loader also being shown in its lowered position.
Figures 4, 4A:
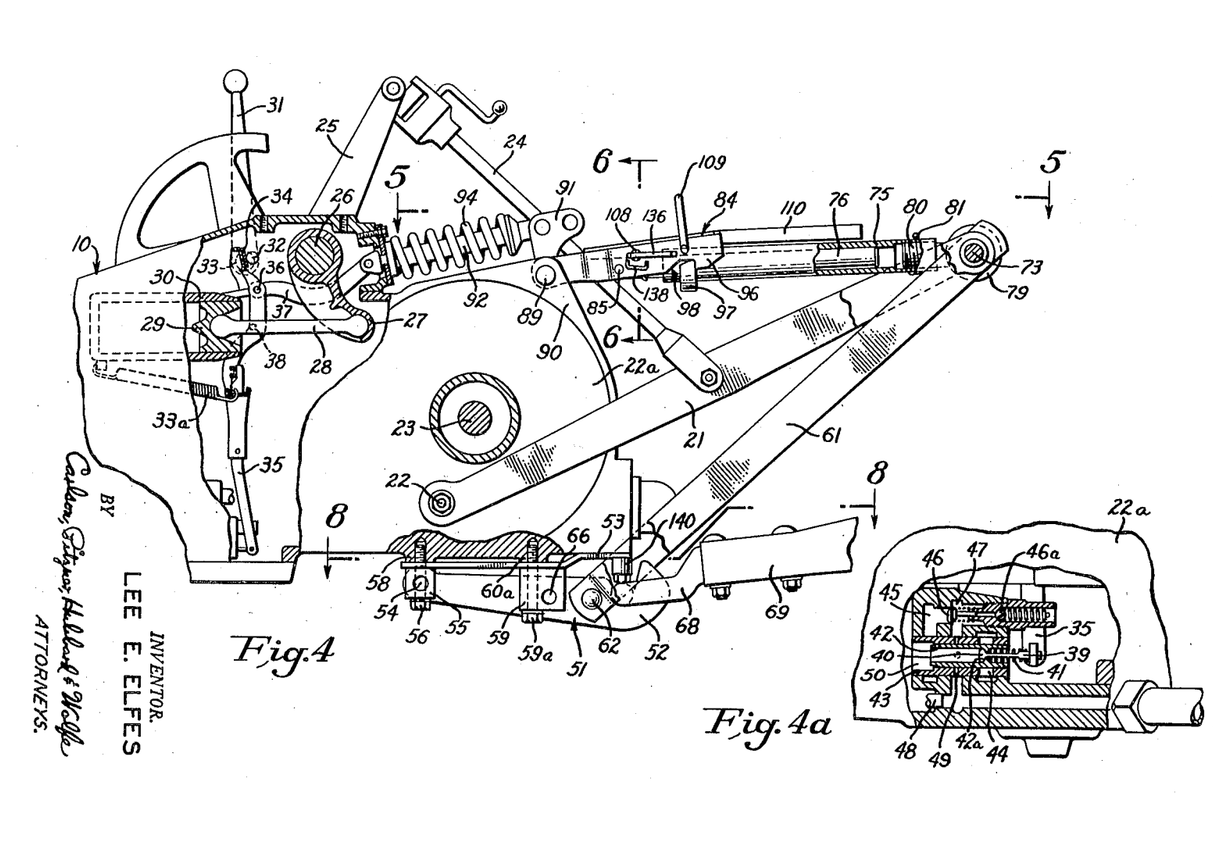
Fig. 4 is a side elevational sectional view of the illustrative hitch taken generally along a line 4—4 shown in Fig. 3 and showing certain details of the hydraulic lift device on the tractor as well as of the hitch itself. In this view, the hitch is shown attached to the tongue of a trailed device.
Fig. 4a is a detail view, partially in vertical section, of the lower portion of the tractor center housing and showing particularly a valve mechanism embodied in the hydraulic lift device.
Figure 4B:
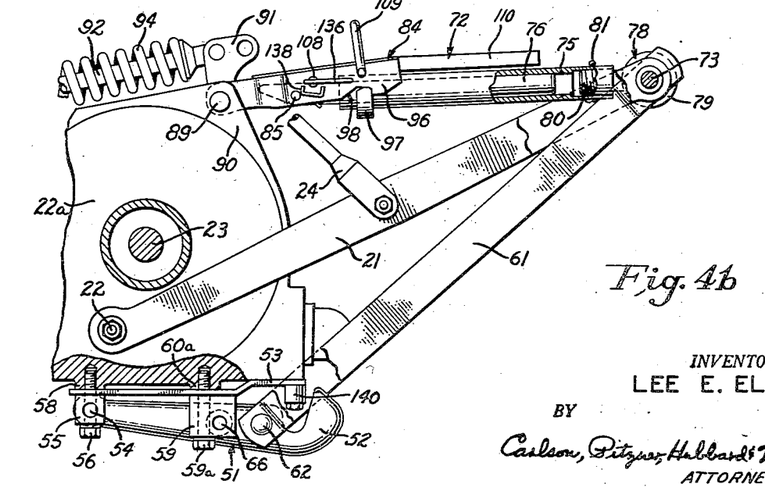
Fig. 4b is a change of position view similar to Fig. 4 but showing the hitch in its fully raised position when not connected to a trailed device.
Figure 5:
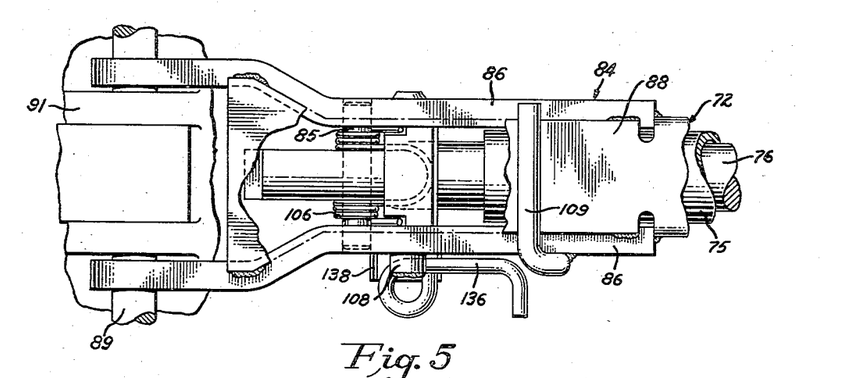
Fig. 5 is a fragmentary enlarged plan view, taken generally along a line 5—5 in Fig. 4, and showing details of a latching mechanism embodied in the illustrative hitch.

When the quadrant lever 31 is pulled to its upper or "raised" position, shown in Figs. 1 and 4, the eccentric 32 tends to retreat from the follower 34 so that the spring 33a swings the floating lever 35 clockwise about its pivot 36, thereby thrusting the valve plunger 42 leftward (as viewed in Fig. 4a) to progressively uncover the intake ports 44 while retaining the exhaust ports 49 closed. Thereupon, pressure fluid (such as oil) is admitted from a sump constituted by a lower portion of the center housing 22a, through the ports 44, and thence to a suitable pump (not shown) driven by the tractor engine. Fluid under pressure is delivered by such pump to a passage 45 (at a rate governed by the extent of opening of the ports 44) from which it passes through a spring loaded check valve 46 into an annular passage 47, and from there through a line 48 into the cylinder 30. The piston 29 is thus pushed toward the rear end of the cylinder, raising the hitch links 21. In order to cut off oil delivery from the pump, the hitch links reach their uppermost or transport position, the piston 29 is arranged so that its skirt will emerge from the cylinder 30 and will contact projections 38 on the floating lever 35, thereby rocking it counterclockwise a sufficient distance to restore the valve plunger 42 to neutral and cut off further supply of oil to the pump. This arrangement is called the "transport cutoff." An over pressure safety valve 46a is provided to bleed fluid into the sump in the event that excessive pressure should develop in the cylinder 30.

To lower the hitch links, the quadrant lever 31 is pushed forward to its "lowering" position as a result of which the floating lever 35 is rocked counterclockwise, pulling the valve plunger 42 rightward (as viewed in Fig. 4a), to uncover the exhaust ports 49 while retaining the supply ports 44 closed. Fluid is thus exhausted from the cylinder 30 through the line 48, exhaust port 49 and the open end 50 of the sleeve 43 into the sump so that the hitch linkage lowers under its gravity load.

As so far described, the installation is simply the familiar one in the current commercial form of "Ferguson" tractor. Pursuant to the aims of the present invention, equipment embodying the invention is installed on such exemplary tractor to utilize the raising and lowering of the power operated hitch links 21 for coupling and uncoupling any desired trailed device, such as a two-wheeled trailer.

Figure 8:
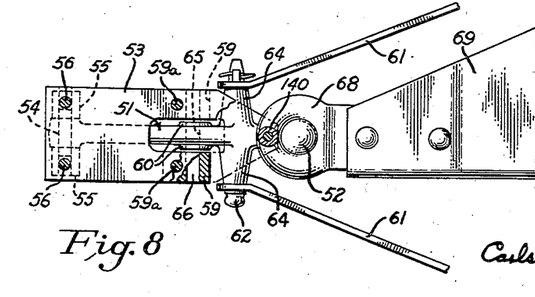
Fig. 8 is a fragmentary sectional view taken generally along a line 8—8 in Fig. 4.

In the illustrative embodiment, the coupling equipment or harness installed on the tractor (see Figs. 4 and 8) includes a link 51 carrying some desired form of coupling element, here shown as an integral hook 52. To provide for swinging the coupling link 51 between a lowered hitching position (Fig. 2) and a raised towing position (Fig. 1), the coupling link 51 is pivoted at its forward end on a horizontal pin 54 carried in a pair of blocks 55, which are mounted beneath a plate 53. The blocks 55 and the plate 53 may be detachably secured to the tractor by means of cap screws 56 adapted to be screwed into threaded bosses 58 formed on the underside of the tractor's center housing 22a.

Reinforcement of the link 51 against lateral bending or swaying, incident to the turning of the tractor when a trailer or other device is being towed from the hook 52, is afforded by a pair of abutment blocks 59 mounted on the underside of the plate 53 and adapted to be positioned on either side of the link 51, at a point between the hook 52 and the pivot pin 54. A pair of laterally projecting bosses 60 are formed on the opposite sides of the link 51 to abut against the blocks 59 when the link is subjected to a lateral load. Cap screws 59a may be utilized to secure the blocks 59 to threaded bosses 60a on the center housing 22a.

Figure 3:
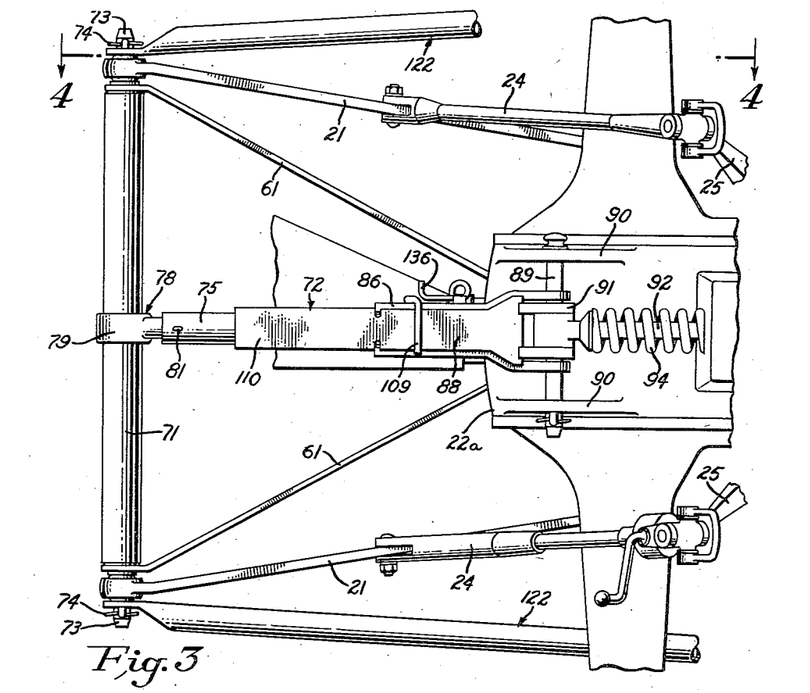
Fig. 3 is an enlarged plan view of the illustrative hitch, with certain parts of the tractor and the front end loader broken away.

To provide for raising and lowering the coupling hook 52, the link 51 coacts with a pair of tension links 61 (Figs. 3, 4 and 8) pivoted at their forward ends on a pivot pin 62 adapted to be removably inserted through apertured projections 64 extending laterally from the opposite sides of the link adjacent the hook 52. By means of the projections 64, the forward ends of the links 61 are spaced apart laterally (see Fig. 8) to provide clearance for movement of the hook 52 and any trailed device which may be hitched to the hook. It may be well to note that the pin 62 may be removed from the link 51 so as to disconnect the tension links 61 when it is not desired to connect the link 51 to the hydraulic lift device on the tractor. Formed in the link 51 is an aperture 65 extending through the bosses 60. When the link 51 is in its raised position, the aperture 65 will be alined with apertures 66 in the blocks 59, so that the pin 62 may be inserted through the apertures 65 and 66 to stow the link in its raised position.

By connections hereafter to be described in detail, the rearward ends of the tension links 61 are adapted to be attached to the trailing ends of the corresponding hitch links 21. The links 51 and 61 thus constitute a jointed supporting linkage for the coupling hook 52. Such supporting linkage jack-knifes or sags downward to the position shown in Fig. 2 when the hitch links 21 are lowered, the hook 52 thereby being located at or near the ground level so it can go beneath even a very low lying coupling element on a trailer or the like. Upon rise of the hitch links 21 to the elevated position of Fig. 1, the supporting linkage 51, 61 tends to straighten out, elevating the hook 52 to its towing position. The jack-knifing of the linkage 51, 61 results in an exaggeration of hook motion, as compared to hitch link motion and, moreover, locates the hook 52 more favorably for purposes of coupling, towing and steering than would be the case if the hook were directly attached to the hitch links.

In Figs. 1 and 4, the hook 52 is shown hitched up to an eye hitch element or ring 68 mounted at the front end of a tongue 69 which may be secured to a trailer or some other trailed implement (not shown).

To relieve the hydraulic ram 29, 30 of the trailed load once the hook 52 has been raised by the hitch links 21 into towing position, provision is made for positively and automatically latching the hitch in place when the hitch links have been raised by a predetermined amount. In the present instance, a generally T-shaped assembly (Fig. 3) is installed on the tractor hitch, comprising a transverse cross bar 71 and an extensible and contractible suspension link or strut 72. Formed on the opposite ends of the cross bar 71 are reduced hitch pins 73 adapted to be received in the usual apertured balls socketed in the ends of the hitch links 21, the pins 73 being retained in place by link pins 74. It is on such hitch pins 73 that the trailing ends of the tension links 61 are pivoted.

The suspension link 72 is shown as comprising telescoping cylindrical tubular members 75 and 76 of circular cross section. To form a connection between the outer member 75 and the cross bar 71, the lower end of the member 75 is provided with a hanger 78 comprising a ring 79 surrounding the cross bar 71 and having a threaded stem 80 adjustably screwed into the lower end of the member 75, the length of the link 72 thereby being adjustable to allow for manufacturing tolerances. To maintain the adjustment of the hanger 78, a cotter pin 81 may be inserted through aligned apertures or slots in the stem 80 and the member 75. By means to be described presently, the upper end of the inner telescoping member 76 is adapted to be connected to an anchoring point on the tractor 10.

Provision is made for latching the telescoping members 75 and 76 in contracted position, against relative extension. For this purpose, the upper end of the inner telescoping member 76 is pivotally connected to a generally channel-shaped latch member 84, by means of a pivot pin 85 which is journaled in the latch member intermediate its ends. In this instance, the latch member 84 is formed with heavy side members 86 and a relatively light hood or top 88, all welded together or otherwise suitably joined. The upper or front ends of the side members 86 are adapted to be pivotally attached to the tractor by means of a long hitch pin 89 which may be inserted through apertured bosses 90 formed on the upper portion of the tractor's center housing 22a. Those skilled in the art will recall that the bosses 90 and the pin 89 are normally provided on the illustrated "Ferguson" tractor, to receive the usual rocker 91, which operates through a rod 92 against the bias of a control spring 94, so as to shift the member 37 during automatic draft control operation. Since automatic draft control operation is not required or employed with the equipment of the present invention, further description of the same is unnecessary here. Suffice it to note that in the present case the pin 89 serves simply as a conveniently located anchorage point on the tractor for the strut 72. For further detail of the pin and its mounting see U. S. Patent 2,486,257, issued October 25, 1949, on the application of E. V. Bunting.

To latch the members 75 and 76 in telescoped relation, the latch member 84 and the member 75 are provided with interengageable latching elements, illustrated as taking the form of a pair of hooks 96 on the latch member 84 and a latching abutment or stop 97 on the outer telescopic member 75. It will be seen that the hooks 96 are formed by downwardly opening notches 98 which are provided in the lower edges of the side members 86, adjacent their rear ends. Each notch 98 provides a forwardly facing latch abutment 99 and a slanting rearwardly facing ramp 100. Ramps 101 and 102 are also formed on the rear edges of the hooks 96 and the front edges of the stop 97 so that the latter will readily cam the latch member 84 upwardly as the members 75 and 76 move into telescoped relation. In this instance, the stop 97 takes the form of a segment of a ring which may be welded or otherwise suitably secured to the underside of the outer telescopic member 75. In addition to the ramp 102, the upper ends of the segmental ring 97 are provided with rearwardly facing abutment surfaces 104 adapted to engage the abutments 99 on the latch member 84.

As the members 75 and 76 move into telescoped relation, the stop 97 will engage the ramps 101 on the rear end of the latch member 84 and thereby will cam the latch member upwardly into jack-knifed relation with the member 76. As the telescoping movement proceeds, the stop 97 will move into registration with the notches 98, and the hooks 96 will move downwardly behind the stop under the weight of the members 75, 76 and 84. This latching movement of the hooks 96 will straighten the member 84 relative to the members 75 and 76. In this instance, the action of gravity, which tends to straighten the members 76 and 84, is supplemented by the force of a torsion spring 106 which is coiled around the pivot pin 85. The central portion of the spring 106 is looped under the member 76, and the ends of the spring act against a pin 108 extending between the side members 86 of the latch member 84.

As will be explained shortly, the hitch is arranged to block the hitch links 21 slightly below their transport position, when a trailer or the like is connected to the link 51. Accordingly, the transport cutoff will not come into operation and the pump will continue to deliver oil as long as the quadrant lever 31 is kept in its raised position.

Once the member 75 has been latched to the latch member 84, the strut 72 will positively and mechanically sustain the hitch link 51 in raised position. Thus, the hydraulic lift device may be relieved of the load of the trailed device simply by moving the quadrant lever downwardly to release the hydraulic pressure from the cylinder 30.

To unlatch the member 84 from the member 75, the quadrant lever may again be moved upwardly to its "raised" position so that the hydraulic ram 29, 30 will assume the trailed load and will relieve the pressure between the latching abutments 99 and 104. By pulling upwardly on a handle 109 which is secured to the latch member 84 adjacent its rear end, the member 84 may be jack-knifed upwardly, relative to the members 75 and 76, so that the hooks 96 will be moved out of latching relation with the stop 97. With the latch member 84 thus raised, the trailed load may be lowered by moving the quadrant lever 31 downwardly to its lowering position.

The safety of the hitch of this invention is greatly enhanced by the fact that the strut 72 may not be unlatched when it is sustaining the load of the trailed device. Under this condition, the strut 72 will be under tension, with the result that the strut will tend to be kept straight. Moreover, the pressure between the latching abutments 99 and 104 will produce great frictional resistance to upward jack-knifing of the latch member 84. Thus, it will be virtually impossible for the operator to swing the hooks 96 upwardly when the strut 72 is under load. In consequence, all danger of abruptly dropping the trailed load is virtually eliminated, and the hitch will thereby be protected against possible damage.

Since the strut 72 is latched by downward movement of the member 84, and unlatched by upward movement of this member, it will be safe for the operator to step on the strut 72, when a trailed load is connected to the hitch. This will often be convenient in stepping from the tractor to the trailed device for inspection or adjustment of the latter. Since the engagement of the stop 97 with the side members 86 prevents the link 72 from jack-knifing downwardly, the weight of the operator will merely tend to move the latch member 84 into even firmer latching engagement with the stop 97.

As a further safety feature, the latch member 84 is provided with a rearwardly extending guard 110 which overlies the telescopically engaged members 75 and 76 and thereby prevents the driver or any object from being caught between the outer telescopic member 75 and the latch member 84.

Provision is made for combining the hitch with an auxiliary implement such as a front end loader 112, which is illustrated as being of the general type disclosed and claimed in the Nelson application Serial No. 14,763, filed March 13, 1948, now Patent No. 2,658,635 of November 10, 1953. The present invention is not concerned with the details of the loader itself, but by way of summary it may be said that the illustrated loader comprises a load lifting element in the form of a fork 114 which is pivotally carried at each side on a pair of vertically spaced arms 115 and 116. The latter are in turn pivoted on a bracket 118 adapted to be attached to the front portion of the tractor 10. In order that the draft links 21 may be employed to raise and lower the fork 114, the lower supporting rod 116 is provided with an upwardly extending bracket 119 which is pivotally connected to a rearwardly extending pull rod 120. An auxiliary hydraulic cylinder 121 is connected between the rear end of the pull rod 120 and the rear lower corner of a rigid triangular frame 122 comprising three members 124, 125, and 126. At its apex or upper corner, the triangular frame 122 is pivoted on a bracket 128 mounted on the underside of the axle housing for the tractor 10. In this instance, the rear lower corner of the triangular frame 122 is connected to the corresponding draft link 21 by means of the hitch pin 73 on the cross bar 71. By means of a hose 130 and a releasable check valve 132, the auxiliary hydraulic ram 121 is connected to the hydraulic cylinder 30 on the tractor. In this instance, the check valve 132 is arranged to be released or opened by downward movement of the quadrant lever to its lowering position.

In this instance the unit loading on the auxiliary ram 121 is made less than on the main ram 29, 30 so that the auxiliary ram 121 will operate first, when the quadrant lever 31 is raised. Next, the main ram 29, 30 will effect upward movement of the draft links 21. Both the action of the auxiliary cylinder 121 and the raising movement of the draft links 21 will pull the draw rods 120 rearwardly so that the fork 114 will be raised to the position shown in Fig. 1. To lower the fork 114 the quadrant lever is moved downwardly to its lowering position so that fluid will escape from the cylinder 30 and the auxiliary cylinder 121. The resulting downward movement of the links 21, and the extension of the ram 121, will allow the fork 114 to move gradually downwardly into the position shown in Fig. 2.

Figures 6, 7:
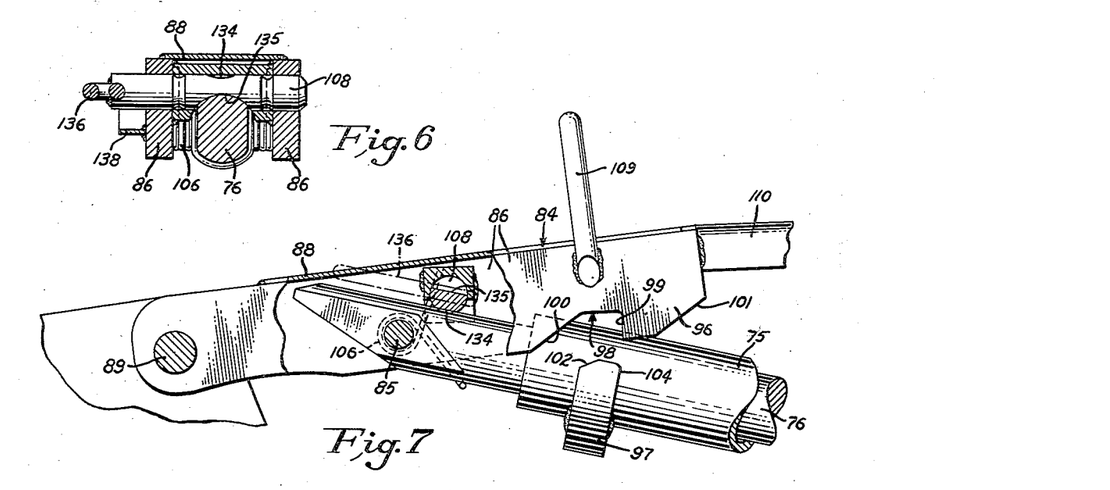
Fig. 6 is a fragmentary enlarged sectional view taken generally along a line 6—6 in Fig. 4.
Fig. 7 is an enlarged fragmentary side elevational sectional view similar to the upper portion of Fig. 4 but showing the latching mechanism in disabled position.

Provision is made for disabling the latching action of the strut 72 so as to avoid interfering with the operation of the front end loader 112 or any other auxiliary implement of similar requirements. In this instance, the disablement is accomplished by selectively blocking the latch member 84 in jack-knifed position, relative to the telescopic member 76. For this purpose the pin 108 is formed as a cam and is arranged to be rotatable between disabling and inactive positions. As illustrated, the pin 108 is formed with diametrically opposite peripheral recesses 134 and 135 adapted to engage the upper side of the telescopic member 76. The recess 135 is relatively deep to form the low point on the cam while the recess 134 is relatively shallow, thus forming a high point of the cam. In order to provide for rotating the cam pin 108 through approximately 180 degrees and thereby bring either of the recesses 134 and 135 into action, the pin is provided with a hand crank 136 which is engageable with a channel-shaped stop bracket 138 so as to define the limits of rotation of the pin 108. When the pin 108 is rotated to the position shown in Fig. 4, with the deeper recess 135 facing downwardly, the members 75 and 84 may be straightened into latching relation. On the other hand, when the pin 108 is rotated to the disabling position, as shown in Fig. 7, the downwardly facing recess 134 will engage the upper side of the member 76 and thereby arrest the members 76 and 84 in upwardly jack-knifed relation so that the hooks 96 cannot move down behind the stop 97. Under this condition, the outer and inner telescoped members 75 and 76 will be free to move into and out of telescoped relation, but the latching action of the member 84 will be disabled. Thus, the front end loader 112 will not be latched in its fully raised position, and the loader may consequently be lowered without the necessity for releasing the latching strut 72. As a result of this construction, the front end loader 112 may be employed in the normal manner with the trailer hitch attached to the tractor. This is a feature of great convenience, since the front end loader may be used to load a trailer, and then the trailer may immediately be hitched to the tractor and towed away without the necessity for changing implements or making any adjustment, other than rotating the cam pin 108 from its disabling to its inactive position.

In accordance with another feature of the present invention, the hitch is arranged so that the hydraulic system on the tractor will be available for auxiliary service when a trailed device is connected to the hitch, but will nevertheless operate in the normal manner when there is no trailed device connected to the hitch. It will be recalled that the hydraulic system of the tractor is arranged so as to be disabled automatically by the so-called "transport cut-off" when the draft links 21 move into their normally uppermost position. This disabling action occurs when the skirt of the piston 29 moves against the projections 38 on the control lever 35 and thereby moves the valve plunger 42 to its neutral position, as described in greater detail above. In the present hitch, the arrangement is such that the links 21 will be blocked short of their transport cut-off or normally uppermost position, when the trailed device is connected to the hitch, but will be permitted to rise to their normally uppermost position when the trailed device is disconnected. For this purpose, the hitch is provided with a stop 140 (Figs. 4 and 8) adapted to engage the trailed device and thereby terminate upward movement of the link 51 and the draft links 21. As illustrated, the stop 140 takes the form of a tang at the rear end of the plate 53 which is interposed between the blocks 55 and 59 and the center housing 22a of the tractor. The stop 140 extends downwardly over the hook 52 and thus is adapted to engage the ring 68 or other hitching element on the trailed device. The engagement of the stop 140 with the ring 68 will arrest upward movement of the hitch link 51, and the length of the tension links 61 is such that this will terminate upward movement of the draft links 21 short of their normally uppermost position, so that the transport cut-off will not come into operation and the hydraulic system will not be disabled. Accordingly, the hydraulic pressure in the hydraulic system will remain under the control of the quadrant lever and thus may be employed to operate auxiliary hydraulic rams (not shown) on the trailed vehicle or implement. Such auxiliary rams may conveniently be employed for various purposes, known to those skilled in the art, on trailers, forage harvesters, planters, corn pickers and many other implements.

When the trailed device is disconnected from the hitch, the ring 68 will not be present in the hook 52, and the hitch link 51 will thus be free to rise an additional amount which will be sufficient to permit movement of the draft links 21 into their normally uppermost position, so that the transport cut-off will disable the hydraulic system. Accordingly, the operation of the hydraulic system will be entirely normal when there is no trailed device connected to the hitch. This feature of construction is of considerable advantage when the hitch is employed in combination with an implement such as the front end loader 112. When the loader 112 is raised to its uppermost position, the present hitch will not interfere with the normal transport cut-off, assuming that no trailed device is connected to the hitch. Were this not the case, excessive pressure would develop in the hydraulic system with the loader 112 fully raised, and oil would be pumped through the pressure relief valve 46a. The resulting unnecessary operation of the hydraulic system would heat the hydraulic fluid and cause unnecessary wear on the hydraulic pump and consumption of fuel by the tractor engine. With the present hitch, the transport cut-off will disable the hydraulic system when the front end loader 112 is raised to its uppermost position, and the loader will be sustained in this position by the hydraulic fluid trapped in the cylinder 30. The loader 112 may be lowered in the normal manner by moving the quadrant lever 31 downwardly and thereby shifting the control plunger 42 so that fluid may escape from the cylinder 30 through the exhaust ports 49.

While the operation of the illustrative embodiment has already been described in detail, it may conveniently be summarized at this point. When the hitch is fully attached to the tractor, and it is desired to hitch up a trailed device, the latching strut 72 is released by pulling up on the handle 109, and the quadrant lever is then moved to its lowering position so that the draft links 21 and the hitch link 51 will descend by gravity, into the position shown in Fig. 2. When the front end loader 112 is attached, the fork 114 will also be lowered. The driver will then back the tractor to bring the hook 52 underneath the ring 68 on the tongue 69 of the trailer or trailed implement, whereupon the hook 52 may be raised by moving the quadrant lever 31 to its raised position. Before the links 21 reach their normally uppermost position, the stop 140 will engage the ring 68 so as to terminate the upward movement of the links 21 and thereby prevent the transport cut-off from disabling the hydraulic system. Accordingly, the hydraulic system may be employed to operate auxiliary rams on the trailed device. Shortly before the stop 140 engages the ring 68 the latch stop or abutment 97 on the telescopic member 75 will cam the latch member 84 upwardly and then move into registration with the latch slots 98, whereupon the hooks 96 on the member 84 will move behind the stop 97, under the force of gravity and of the spring 106. It then will be possible to move the quadrant lever into its lowering position, whereupon the strut 72 will sustain the link 51 and the trailed device. Due to the tension in the strut 72, it will be virtually impossible to unlatch the strut when a load is being carried.

When it is desired to unhitch the trailed device, the quadrant lever will be moved upwardly into its raised position so that the draft links 21 will assume the weight of the trailed device and thereby relieve the pressure between the hooks 96 and the latch stop 97. Next, the handle 109 will be pulled upwardly so as to jack-knife the latch member 84 relative to the telescopic member 76. Moving the quadrant lever downwardly will then permit the links 21 and the trailed device to descend gradually under their own weight, the rate of descent being controlled by the slow escape of the hydraulic fluid through the exhaust ports 49.

With the trailed device unhitched, the front end loader may be employed in the normal manner simply by rotating the cam pin 108 to its disabling position, shown in Fig. 7. This will block the latch member 84 in jack-knifed position, relative to the telescoping member 76, and thereby will prevent movement of the members 75 and 84 into latching relation. Accordingly, the members 75 and 76 will be free to move telescopically and the loader 112 will not be latched in its raised position.

Furthermore, the absence of the ring 68 on the trailed device will allow the link 51 to move upwardly without interference from the stop 140 so that the draft links 21 of the tractor may move to their normal uppermost position, and thus bring the transport cut-off into play. Accordingly, the valve plunger 42 of the control valve in the hydraulic system will be moved to neutral position when the loader is fully raised, and the hydraulic system will thereby be disabled to prevent unnecessary pumping of the hydraulic fluid through the pressure relief valve 46a.

To disconnect the hitch from the tractor, the latch member 84 is removed from the long pin 89, and the hitch pins 73 on the cross bar 71 are removed from the draft links 21. Ordinarily, the hitch link 51 need not be removed completely from the tractor. It is sufficient to withdraw the pin 62 from the apertured projections 64, thus disconnecting the tension links 61, and then to insert the pin 62 through the alined apertures 65 and 66 in the link 51 and the blocks 59, whereupon the pin 62 will hold the link 51 in its raised position. If it is desired to remove the link 51 from the tractor, it is a simple matter to unscrew the cap screws 56 and 59a and thereby remove the blocks 55 and 59 and the stop plate 141.

I claim as my invention:

1. In a strut for use on a tractor to sustain a trailingly pivoted vertically swingable draft link thereon operable by a power lift device, the combination comprising an elongated latch member having a downwardly opening latch hook adjacent one end and attaching means pivotally attachable to the tractor adjacent the other end, first and second relatively extensible telescoped members, said first member having a pivotal connection at its outer end to said latch member at a point thereon between said latching hook and said attaching means, said latch member and said first telescoped member thereby forming a linkage adapted to be jack-knifed upwardly, said second telescoped member having attachment means at its outer end pivotally attachable to the draft link, means for preventing downward jack-knifing of said latch member, and said first member, a latching element on said second telescoped member for engaging said latching hook when said first and second members are telescoped and said first member and said latch member are in straightened relationship, said latching element and said latching hook being disengageable by upward jack-knifing movement of said latch member and said first member, means for manually jack-knifing said latch member and said first member upwardly to disengage said latching hook and said latching element so that the draft link may be lowered, and a throw-out cam selectively movable between an inactive position and a throw-out position in which said cam is engageable with said first member to prevent straightening of said first member relative to said latch member and thereby prevent latching engagement between said latching hook and said latching element.

2. In an attachment for use on a tractor adapted to tow a trailed device and having a trailingly pivoted vertically movable draft link operable by a hydraulic power lift device provided wtih a disabling control for cutting out operation thereof upon elevation of the link into its uppermost position, the combination comprising a coupling device attachable to the draft link and movable therewith between a lowered hitching position and a raised towing position, said coupling device being adapted to be hitched to a trailed device, a latch member pivoted at one end to an anchoring point on the tractor, first and second relatively extensible telescoped members, said first member having a pivotal connection at its outer end to said latch member, said second member having a pivotal connection at its outer end to the draft link, means for latching said latch member and said first member for retaining said coupling device in its towing position when said first and second members are telescoped and said first member and said latch member are in straightened relationship, a throw-out cam engageable with said first member for preventing straightening of said first member relative to said latch member and thereby disabling said latching means, and stop means positioned adjacent said coupling device and engageable by the trailed device for terminating upward movement of the draft link short of its normally uppermost position to prevent operation of the disabling control.

3. In an attachment for use on a tractor adapted to tow a trailed device and having a trailingly pivoted vertically movable draft link operable by a power lift device, the combination comprising a coupling device attachable to the draft link and movable therewith between a lowered hitching position and a raised towing position, said coupling device being adapted to be hitched to a trailed device, a latch member pivoted at one end to an anchoring point on the tractor, first and second relatively extensible telescoped members, said first member having a pivotal connection at its outer end to said latch member, said second member having a pivotal connection at its outer end to the draft link, means for latching said latch member and said first member for retaining said coupling device in its towing position when said first and second members are telescoped and said first member and said latch member are in straightened relationship, and a throw-out cam engageable with said first member for preventing straightening of said first member relative to said latch member and thereby disabling said latching means.

4. In a device for use on a tractor for selectively sustaining the load of a draft link provided with a power lift device, the combination comprising first and second relatively extensible members, a latch member pivotally connected at one end to an anchoring point on the tractor, said first member having a pivotal connection at its outer end to said latch member, said latch member and said first member thereby forming a linkage adapted to be jackknifed upwardly, said second member having attachment means at its outer end pivotally attachable to the draft link, interengageable latching means on said latch member and said second member for latching said first and second members in contracted relation when said latch member and said first member are substantially alined, said latching means being disengageable by jackknifing said latch member relative to said first member, and throw-out cam means to prevent straightening of said first member relative to said latch member so as to disable said latching means.

5. In a coupling attachment for attaching a trailed device to a tractor having a draft link operable by a hydraulic power lift device provided with a disabling control for cutting out operation thereof upon elevation of the link into its uppermost position, the combination comprising a coupling device attachable to the tractor draft link and movable therewith between a lowered coupling position, an elevated towing position, and an uppermost position, said coupling device being adapted to be hitched to the trailed device, and a stop element attached to said tractor adjacent said coupling device and engageable by that portion of the trailed device that is hitched to said coupling device for terminating upward movement of the draft link and the coupling device short of their respective uppermost positions to prevent operation of the disabling control, said coupling device affording clearance for said stop element to allow upward movement of the draft link and the coupling device to their respective uppermost positions when the trailed device is unhitched from the coupling device.

6. In an attachment for a tractor having a vertically swingable draft link operable by a hydraulic power lift device having a disabling control for cutting out operation thereof upon elevation of the link into its uppermost position, the combination comprising a load lifting element attachable to the tractor and movable between a lowered loading position and a raised transport position, means attachable to the draft link for raising and lowering said load lifting implement by operation of the hydraulic power lift device, a coupling device attachable to the draft link and movable therewith between a lowered coupling position, an elevated towing position, and an uppermost position, said coupling device having a recess therein for receiving a complementary coupling member on a trailed device, and a stop element attached to said tractor and forming an abutment adjacent said recess and within the path of movement of said complementary coupling member when the latter is within said recess for defining the extent of upward movement of the draft link and the coupling device, said stop element being engageable by said complementary coupling member when the latter is within said recess and said coupling device is in its elevated towing position for terminating upward movement of the draft link short of its normally uppermost position to prevent operating of the disabling control, said stop element being received in the recess of said coupling device to allow upward movement of the draft link and the coupling device to their respective uppermost positions when said complementary coupling member is withdrawn from said recess.

References Cited in the file of this patent

UNITED STATES PATENTS

| 2,458,195 | Pearse | Jan. 4, 1949 |
| 2,617,660 | Hadlock | Nov. 11, 1952 |
| 2,658,635 | Nelson | Nov. 10, 1953 |

FOREIGN PATENTS

| 140,497 | Australia | Mar. 21, 1951 |
| 665,827 | Great Britain | Jan. 30, 1952 |